(12) United States Patent
Kondou et al.

(10) Patent No.: US 8,474,280 B2
(45) Date of Patent: Jul. 2, 2013

(54) REFRIGERATING STORAGE CABINET AND CONTROL METHOD FOR COMPRESSOR THEREOF

(75) Inventors: Naoshi Kondou, Toyoake (JP); Akihiko Hirano, Toyoake (JP); Shinichi Kaga, Toyoake (JP); Masahide Yatori, Toyoake (JP); Hideyuki Tashiro, Toyoake (JP)

(73) Assignee: Hoshizaki Denki Kabushiki Kaishi, Aichi (JP)

( * ) Notice: Subject to any disclaimer, the term of this patent is extended or adjusted under 35 U.S.C. 154(b) by 988 days.

(21) Appl. No.: 12/527,581

(22) PCT Filed: Feb. 26, 2007

(86) PCT No.: PCT/JP2007/053539
§ 371 (c)(1),
(2), (4) Date: Aug. 18, 2009

(87) PCT Pub. No.: WO2008/105055
PCT Pub. Date: Sep. 4, 2008

(65) Prior Publication Data
US 2010/0082160 A1   Apr. 1, 2010

(51) Int. Cl.
*F25B 1/00* (2006.01)

(52) U.S. Cl.
USPC .................................. 62/228.1; 62/228.4

(58) Field of Classification Search
USPC ............................................. 62/228.1, 228.4
See application file for complete search history.

(56) References Cited

U.S. PATENT DOCUMENTS

| | | | |
|---|---|---|---|
| 4,257,238 A | 3/1981 | Kountz et al. | |
| RE33,620 E * | 6/1991 | Persem | 62/215 |
| 5,255,530 A | 10/1993 | Janke | |
| 5,345,156 A | 9/1994 | Moreira | |
| 6,598,410 B2 * | 7/2003 | Temmyo et al. | 62/179 |
| 2007/0144190 A1 | 6/2007 | Temmyo et al. | |

FOREIGN PATENT DOCUMENTS

| | | |
|---|---|---|
| CN | 1898505 | 1/2007 |
| EP | 1681524 A1 * | 7/2006 |
| GB | 2 059 644 | 4/1981 |
| JP | 60-65571 | 5/1985 |

(Continued)

OTHER PUBLICATIONS

International Search Report issued Apr. 17, 2007 in International (PCT) Application No. PCT/JP2007/053539.

(Continued)

*Primary Examiner* — Marc Norman
*Assistant Examiner* — Jonathan Bradford
(74) *Attorney, Agent, or Firm* — Wenderoth, Lind & Ponack, L.L.P.

(57) ABSTRACT

A deviation calculating unit 42 calculates a deviation between an internal temperature detected by a temperature sensor 35 and a target temperature provided from a target temperature setting unit 41 for each predetermined time period. The deviation is integrated by a deviation integrating unit 46. When the integrated value exceeds a predetermined reference value, a rotational speed of an inverter motor that drives a compressor is increased. Therefore, for example, even if an internal temperature temporarily rises because a door is opened temporarily and outside air flows into a storage compartment, because there is no sudden change in the integrated value of the temperature deviation and the rotational speed of the compressor does not react in an oversensitive manner and rapidly increase. Consequently the control is stable. Thus, an unnecessarily oversensitive response to a sudden change in an internal temperature can be prevented, enabling operation at a higher efficiency.

13 Claims, 14 Drawing Sheets

FOREIGN PATENT DOCUMENTS

| | | |
|---|---|---|
| JP | 61-1942 | 1/1986 |
| JP | 05-126454 | 5/1993 |
| JP | 2000-146398 | 5/2000 |
| JP | 2000-346520 | 12/2000 |
| JP | 2000-356447 | 12/2000 |
| JP | 2002-195719 | 7/2002 |
| JP | 2002-206835 | 7/2002 |
| JP | 2003-121032 | 4/2003 |
| JP | 2004-028370 | 1/2004 |
| JP | 2005-098549 | 4/2005 |
| JP | 2005-121341 | 5/2005 |
| JP | 2007-71520 | 3/2007 |
| TW | 406174 | 9/2000 |
| TW | 454084 | 9/2001 |

OTHER PUBLICATIONS

Supplementary European Search Report dated Mar. 3, 2011 in corresponding European Patent Application No. 07737391.8.

* cited by examiner

REFRIGERATING STORAGE CABINET AND CONTROL METHOD FOR COMPRESSOR THEREOF

TECHNICAL FIELD

The present invention relates to a refrigerating storage cabinet that drives a compressor using an inverter motor, and a control method for the compressor.

BACKGROUND ART

Refrigerators for commercial use have recently been provided with an inverter-driven compressor in which speed control is possible (for example, see Patent Document 1).

There are various advantages to providing an inverter-driven compressor, and an example thereof is that higher efficiency can be achieved when performing a control-cooling operation. The reason is that, in the case of performing a control-cooling operation that maintains the inside of a cabinet at a set target temperature, when the internal temperature approaches the target temperature, control is performed to gradually reduce the speed (rotational speed) of the inverter-driven compressor in response thereto. By adopting this control method, a period of time in which the compressor is continuously in an on state is extremely long. In other words, the number of times of switching between an on state and an off state is significantly decreased, and thus higher efficiency and energy savings can be achieved.

PATENT DOCUMENT 1

Japanese Patent Laid-Open No. 2002-195719

However, the conventional control method determines a deviation between an internal temperature and a target temperature at every fixed time period, and when the deviation is large the control method increases the rotational speed and when the deviation is small the control method reduces the rotational speed. Hence, there is the problem that fluctuations in the rotational speed of the inverter-driven compressor become unnecessarily large. For example, in a case in which control-cooling operations are being performed to maintain the inside of a cabinet close to a target temperature that is suitable for cooling food, if the door is repeatedly opened and closed temporarily, the internal temperature rises suddenly temporarily, and hence a period occurs in which a deviation between the internal temperature and the target temperature temporarily becomes large. In such case, the temperature of the foodstuffs will not rise very much even though the internal temperature rises suddenly since the foodstuffs that are stored in the cabinet have a large thermal capacity. However, according to the conventional control method, because the rotational speed of the inverter-driven compressor is determined according to the size of a deviation between the internal temperature and the target temperature, the rotational speed immediately increases.

In this case also, the control method again reduces the rotational speed after the internal temperature has decreased rapidly after a certain period of time has passed in which the door is closed. However, because the control method increases the rotational speed unnecessarily in response to a temporary temperature increase, the method is not preferable from an efficiency viewpoint.

The present invention has been made in consideration of the foregoing circumstances, and an object thereof is to provide a refrigerating storage cabinet and a control method for a compressor thereof that can prevent an unnecessarily oversensitive response to a sudden change in an internal temperature, and thus operate at a higher efficiency.

SUMMARY OF THE INVENTION

As means for achieving the above object, according to the present invention there is provided a control method of a compressor in a refrigerating storage cabinet that compresses a refrigerant using a compressor that is driven by an inverter motor, supplies the refrigerant to a cooler through a condenser and a throttling device, and cools the inside of a storage compartment by means of cold air that is generated by the cooler, the refrigerating storage cabinet comprising: target temperature setting means for setting a target temperature for inside the storage compartment, and a temperature sensor that detects an internal temperature inside the storage compartment; characterized in that the control method calculates and integrates a deviation between a target temperature that is set by the target temperature setting means and an internal temperature that is detected by the temperature sensor for each predetermined time period, and changes a rotational speed of the inverter motor based on a comparison between the integrated value and a predetermined reference value.

According to the present invention, a configuration can also be adopted in which a refrigerant from the condenser is selectively switched to flow to a first or a second cooler by a valve mechanism. Further, a configuration may be adopted in which the target temperature setting means sequentially outputs target temperatures that differ with the passage of time.

According to the control method of the present invention, a deviation between a target temperature that is set by the target temperature setting means and an internal temperature that is detected by the temperature sensor is calculated and integrated for each predetermined time period, and the rotational speed of the inverter motor that drives the compressor is changed based on a comparison between the integrated value and a predetermined reference value. Thus, for example, even if a door is temporarily opened and outside air flows into the storage compartment to cause the internal temperature to rise temporarily, because there is no sudden change in the integrated value of the temperature deviation, the rotational speed of the compressor does not react oversensitively and rapidly increase to a high speed, and thus the control is stable and contributes to power saving.

DESCRIPTION OF SYMBOLS

Figure 1:
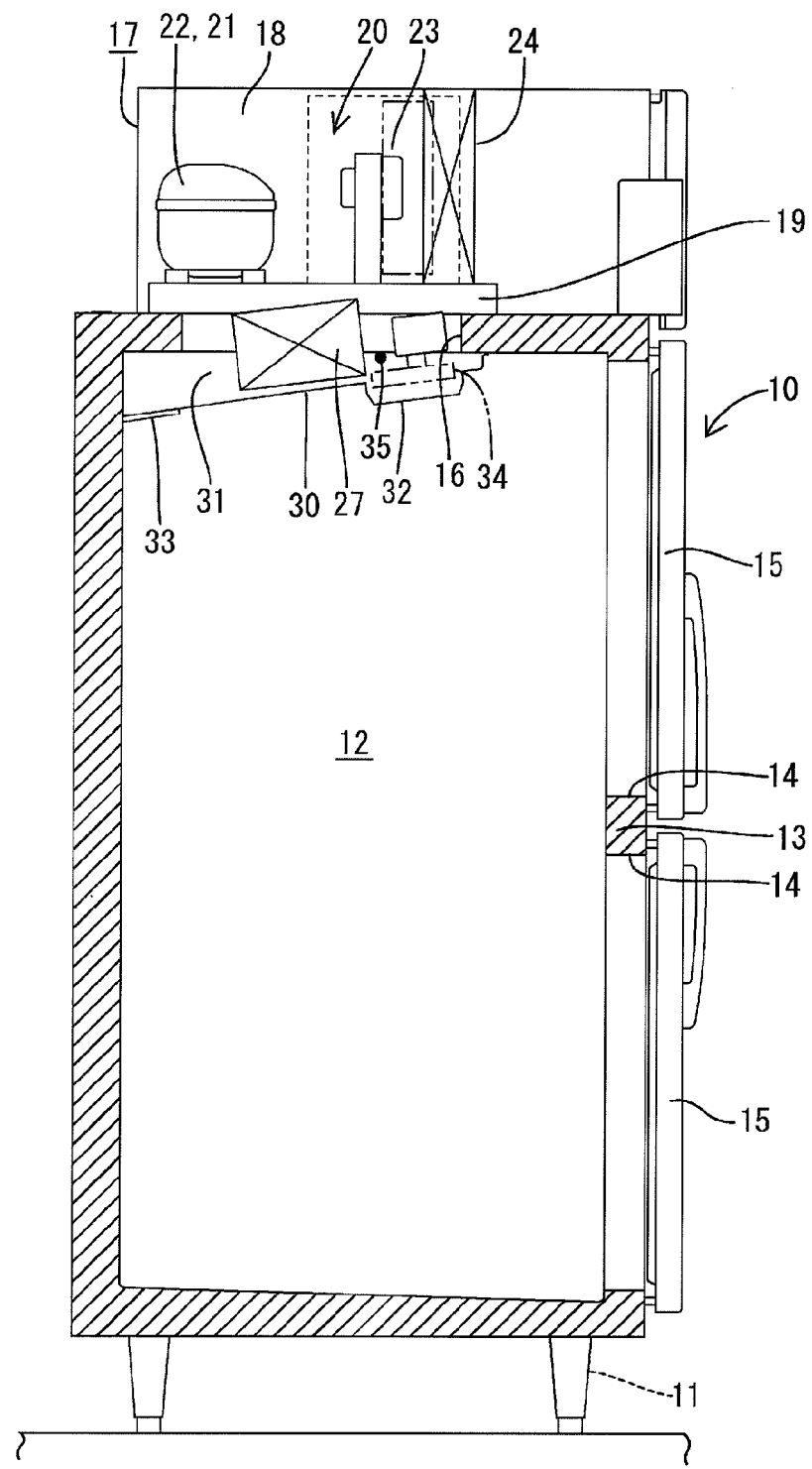
FIG. 1 is an overall sectional view showing embodiment 1 of the present invention.

10 . . . heat insulating storage cabinet, 12 . . . refrigerating compartment, 22 . . . compressor, 26 . . . capillary tube (throttling device), 27 . . . cooler, 35 . . . temperature sensor, 41 . . . target temperature setting means, 42 . . . deviation calculating means, 46 . . . deviation integrating means, 47 . . . rotational speed control means, 50 . . . heat insulating storage cabinet, 51 . . . target temperature calculating means, 53F . . . freezing compartment (first storage compartment), 53R . . . refrigerating compartment (second storage compartment), 72 . . . compressor, 76 . . . three-way valve (valve mechanism), 77F, 77R . . . capillary tube (throttling device), 78F . . . first cooler, 78R . . . second cooler, 82F . . . first flow channel, 82R . . . second flow channel, 91 . . . target temperature setting means, 92 . . . deviation calculating means, 96 . . . deviation integrating means, 97 . . . rotational speed control means

DETAILED DESCRIPTION OF THE INVENTION

Embodiment 1

Embodiment 1 of the present invention will be described with reference to FIG. 1 to FIG. 8.

According to this embodiment, a case is exemplified in which the present invention is applied to a vertical refrigerator for commercial use. First, the overall structure of the refrigerator is described using FIG. 1. The refrigerator comprises a heat insulating storage cabinet 10 that has an open front that is longer than wide, and is supported by legs 11 that are provided at four corners on the bottom surface thereof. The inside of the refrigerator is a refrigerating compartment 12 that is a storage compartment. A partition frame 13 partitions the open front of the refrigerating compartment 12 into two upper and lower open portions 14. Heat insulating doors 15 are pivotally mounted to the open portions 14, respectively, so as to be capable of opening and closing in the horizontal direction.

Figure 2:
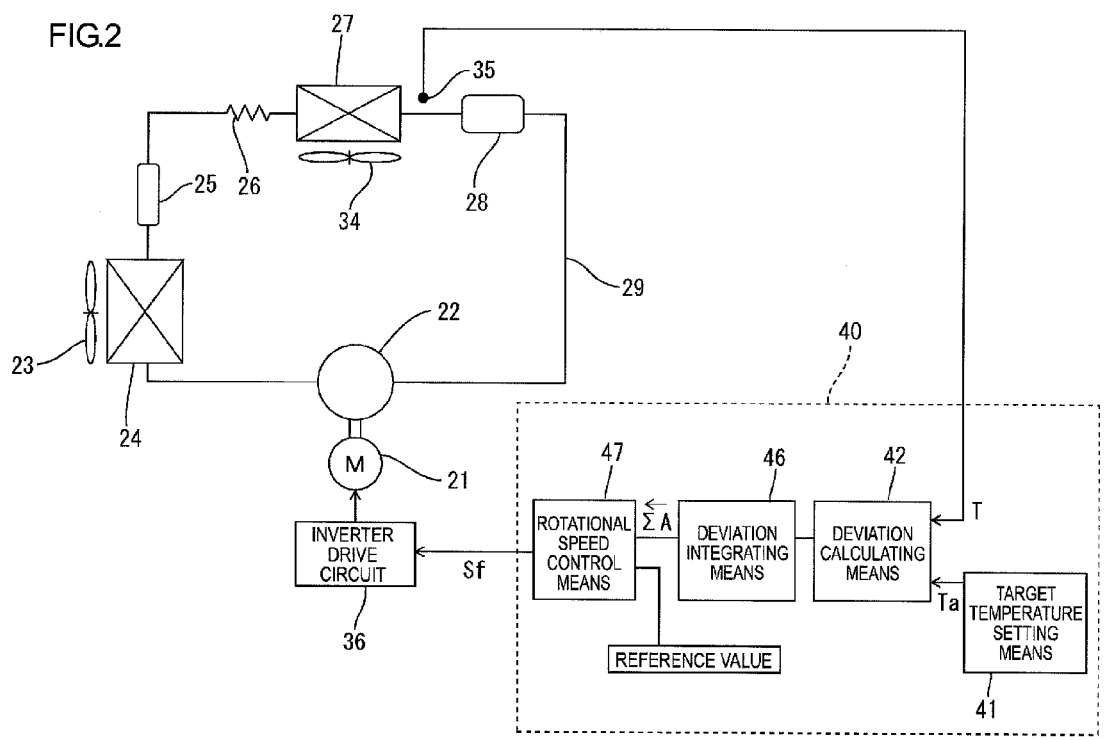
FIG. 2 is a configuration diagram of a freezing cycle according to embodiment 1.

An equipment compartment 18 surrounded by a panel 17 is provided on the top surface of the heat insulating storage cabinet 10, and a freezing unit 20 that is installed on a base 19 is housed therein. As shown in FIG. 2, the freezing unit 20 consists of connecting a compressor 22 that is driven by an inverter motor 21 and that compresses a refrigerant, a condenser 24 that is cooled by a condenser fan 23, a dryer 25, a capillary tube 26 that corresponds to a throttling device, a cooler 27 that vaporizes a refrigerant that has passed through the capillary tube 26, and an accumulator 28 together in a closed loop using refrigerant piping 29. The base 19 is installed so as to block a window hole 16 that is formed in the ceiling of the refrigerating compartment 12.

A drain pan 30, which also serves as an air duct, is provided in a tensioned state on the lower surface side of the window hole 16 in the ceiling portion of the refrigerating compartment 12, and a cooler compartment 31 is formed on the upper part thereof. The bottom of the drain pan 30 is formed so as to be inwardly (left side of FIG. 1) inclined downward, and a blow port 33 is formed by notching at an inner edge side of the drain pan 30. An inlet port 32 is formed at a region on the frontward side of the drain pan 30. Air inside the refrigerating compartment 12 is sucked in by a fan 34 that is provided above the frontward side of the drain pan 30. The air is cooled by the cooler 27, and then returned to the inside of the refrigerating compartment 12 from the blow port 33. In this connection, a temperature sensor 35 for detecting the internal temperature of the refrigerating compartment 12 is provided inside the cooler compartment 31 at a position that comes in contact with air within the compartment that flows in from the inlet port 32.

The aforementioned inverter motor 21 is driven by an inverter drive circuit 36 that outputs an alternating current of a variable frequency. The output frequency is decided by a controller 40. The controller 40 will now be described referring to FIG. 2. The controller 40 comprises target temperature setting means 41 for setting a target temperature for inside the refrigerating compartment 12, and deviation calculating means 42 that calculates a deviation (T−Ta) between a target temperature Ta that is set by the target temperature setting means 41 and an internal temperature T that is detected by the temperature sensor 35.

Figure 3:
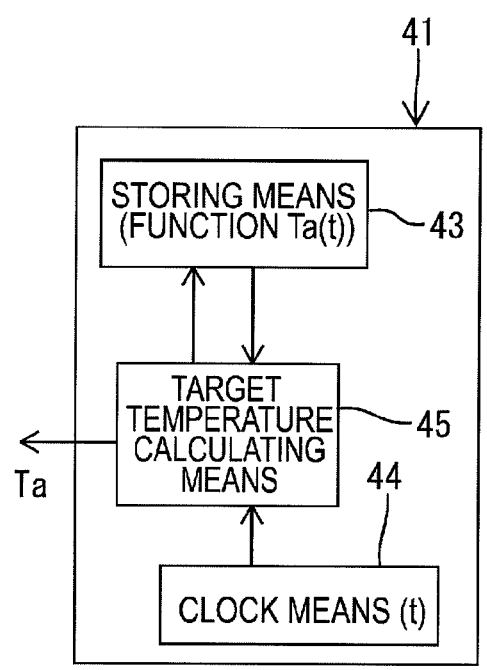
FIG. 3 is a block diagram showing the configuration of target temperature setting means according to embodiment 1.
Figure 4:
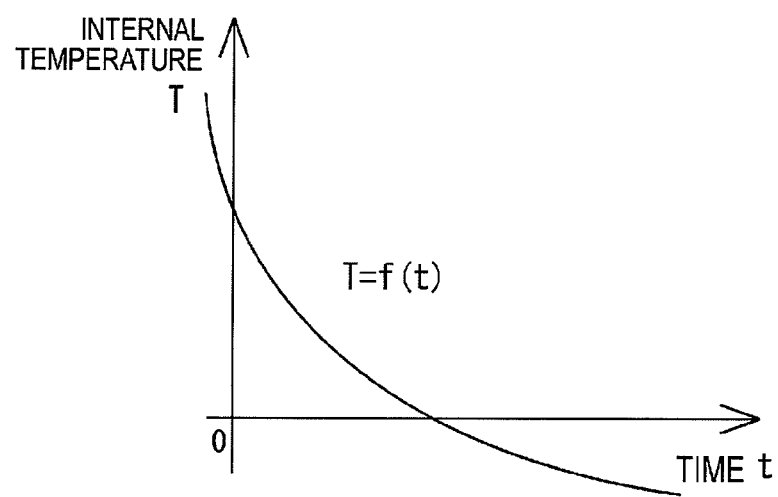
FIG. 4 is a graph showing a mode of variation with time of a target temperature according to embodiment 1.
Figure 5:
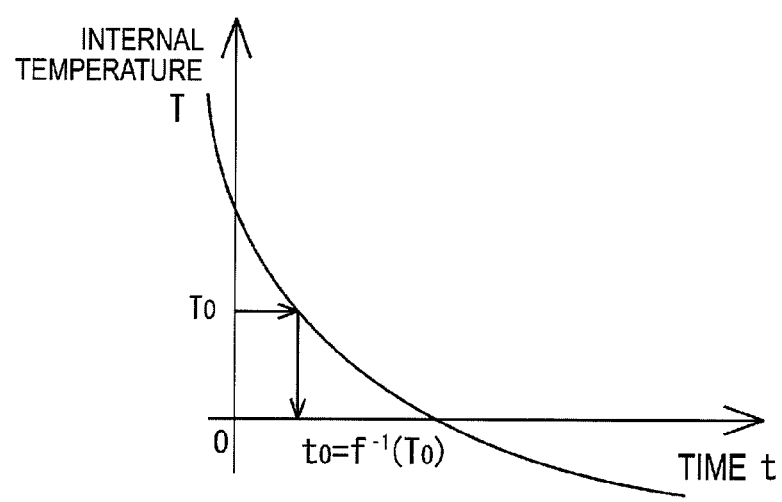
FIG. 5 is a graph that illustrates a calculation process for an initial value according to embodiment 1.
Figure 6:
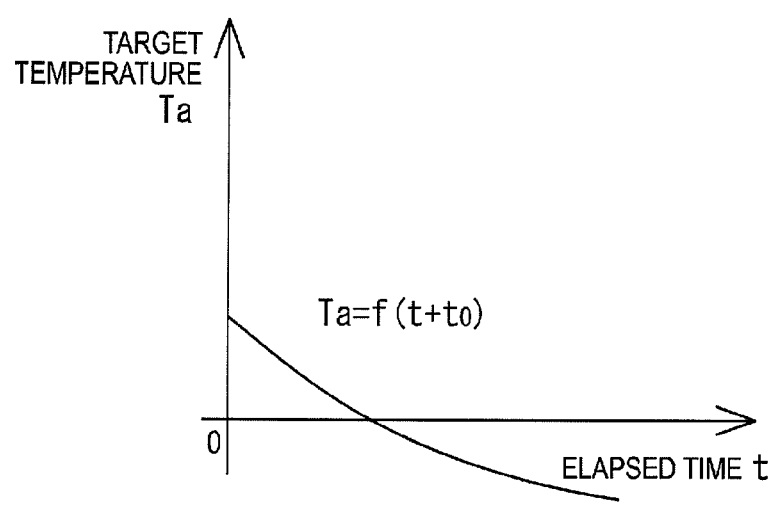
FIG. 6 is a graph showing a mode of variation with time of a target temperature that is decided according to embodiment 1.

The aforementioned target temperature setting means 41 is configured as shown in FIG. 3 according to the present embodiment, and the target temperature Ta is provided as a mode of variation with time thereof (that is, a manner in which a target temperature Ta is changed along with a time t). The target temperature varying modes includes two varying modes. One of the varying modes is a target temperature varying mode at the time of a control operation that cools stored items such as food at a set temperature that is set by the user. The other mode is a target temperature varying mode at a time of a so-called pull-down cooling operation that, for example, as in a case in which a refrigerator is installed and the power is turned on for the first time, performs cooling from a temperature that is substantially higher than a set temperature in the control operation to a lower temperature that is in a temperature range for the control operation. According to the present embodiment, each of these varying modes is represented by a function f(t) that has a time t as a variable. This function is, for example, stored in storing means 43 that comprises an EEPROM or the like. For example, a function illustrated by a graph shown in FIG. 4 can be exemplified as a function f(t) for calculating a target temperature varying mode Ta at the time of a pull-down cooling operation.

On the other hand, the target temperature setting means 41, for example, comprises known clock means 44 that is composed by an unshown pulse generator circuit and counter. A clock signal that is in accordance with the passage of time is output from the clock means 44. The clock signal is supplied to the target temperature calculating means 45. The target temperature calculating means 45 calculates a target temperature Ta for each predetermined time period. More specifically, first, an internal temperature T0 is read in from the temperature sensor 35 when the controller 40 is started (when the power is turned on), and the target temperature calculating means 45 calculates a time initial value t0 from the equation t0=f−1(T0) based on that value (see FIG. 5). Thus, when an elapsed time from the starting time is taken as t, the target temperature Ta can be represented by a function that includes the constant Ta=f(t+t0) (see FIG. 6). Therefore, the target temperature calculating means 45 reads out the aforementioned function from the storing means 43 for each predetermined time period of, for example, 5 seconds, based on the clock signal (shown by a value t) from the clock means 44, and assigns the time initial value t0 and the value of t to calculate the target temperature Ta.

Figure 7:
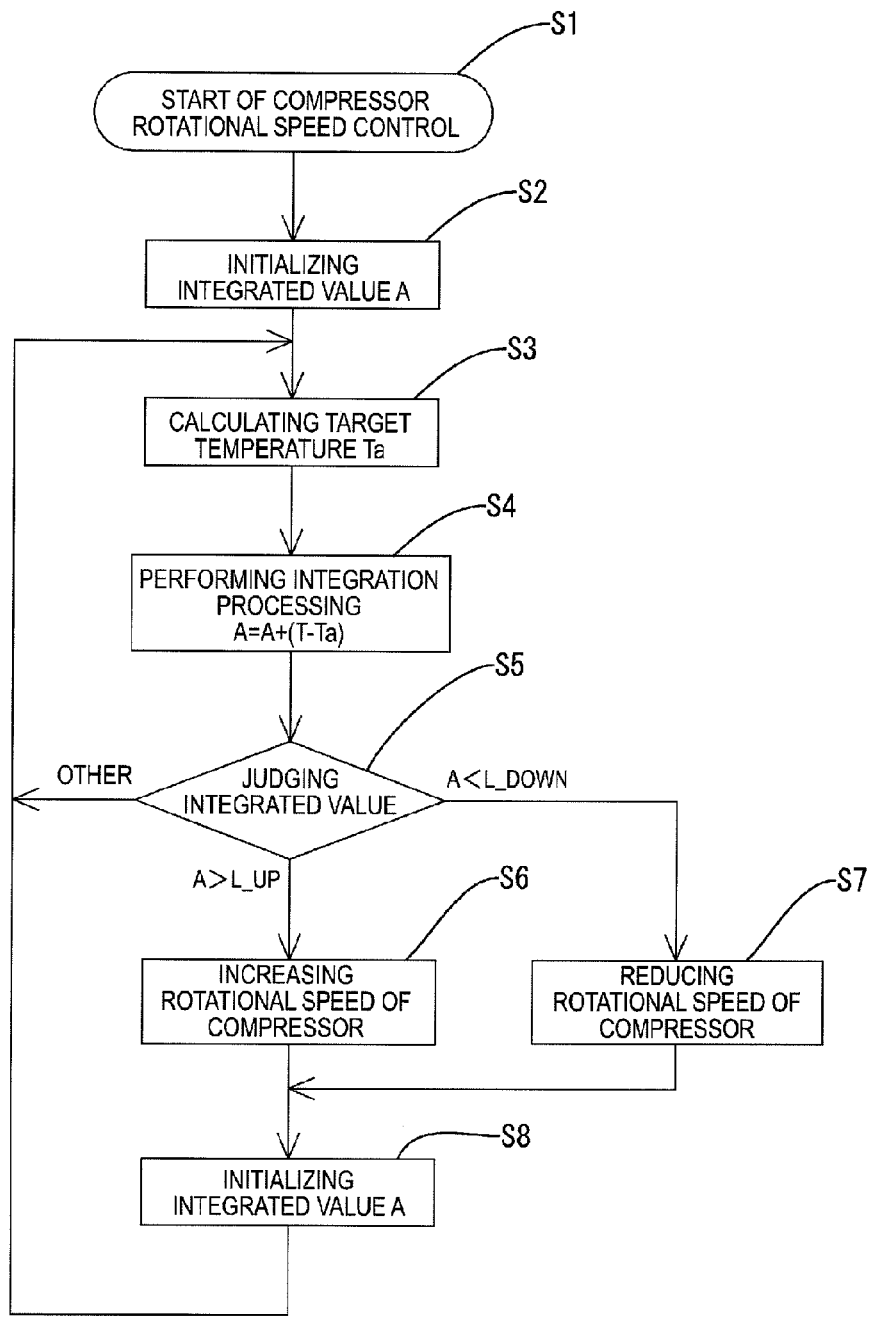
FIG. 7 is a flowchart that illustrates procedures that control a rotational speed of a compressor according to embodiment 1.

As described above, the target temperature Ta from the target temperature calculating means 45 is supplied to the deviation calculating means 42 together with the internal temperature T provided by the temperature sensor 35. The deviation calculating means 42 calculates the deviation (T−Ta). The value of that deviation is supplied to the deviation integrating means 46 at the next stage. In this case, for example, deviations are sequentially integrated during a period of between two minutes and ten minutes (according to this embodiment, five minutes, i.e. 5*60/5=60 times), and that integrated value A is supplied to the rotational speed control means 47. At the rotational speed control means 47, the integrated value A of the deviations is compared with predetermined reference values (lower limit value and upper limit value). When the integrated value A is greater than an upper limit value L_UP, a frequency command signal Sf to the inverter drive circuit 36 is changed so as to increase the rotational speed of the inverter motor 31. When the integrated value ΣA is less than a lower limit value L_DOWN, the frequency command signal Sf to the inverter drive circuit 36 is changed so as to reduce the rotational speed of the inverter motor 31. Note that the functions of the rotational speed control means 47 are realized by software that is executed by a CPU. A processing procedure of the software is as shown in FIG. 7.

The software configuration will now be explained with reference to FIG. 7. When a compressor rotation control commencement routine is started by the CPU (step S1), first, the integrated value A is initialized to, for example, 0 (step S2). Next, as described above, the target temperature setting means 41 calculates the target temperature Ta (step S3), and thereafter calculates the deviation A with respect to the internal temperature T and integrates this value (functions of deviation calculating means 42 and deviation integrating means 46: step S4). Subsequently, in step S5, the CPU compares the integrated value with the upper limit value L_UP and the lower limit value L_DOWN, and increases or reduces the rotational speed of the inverter motor 31 (function of rotational speed control means 47: steps S5 to S7).

Figure 8:
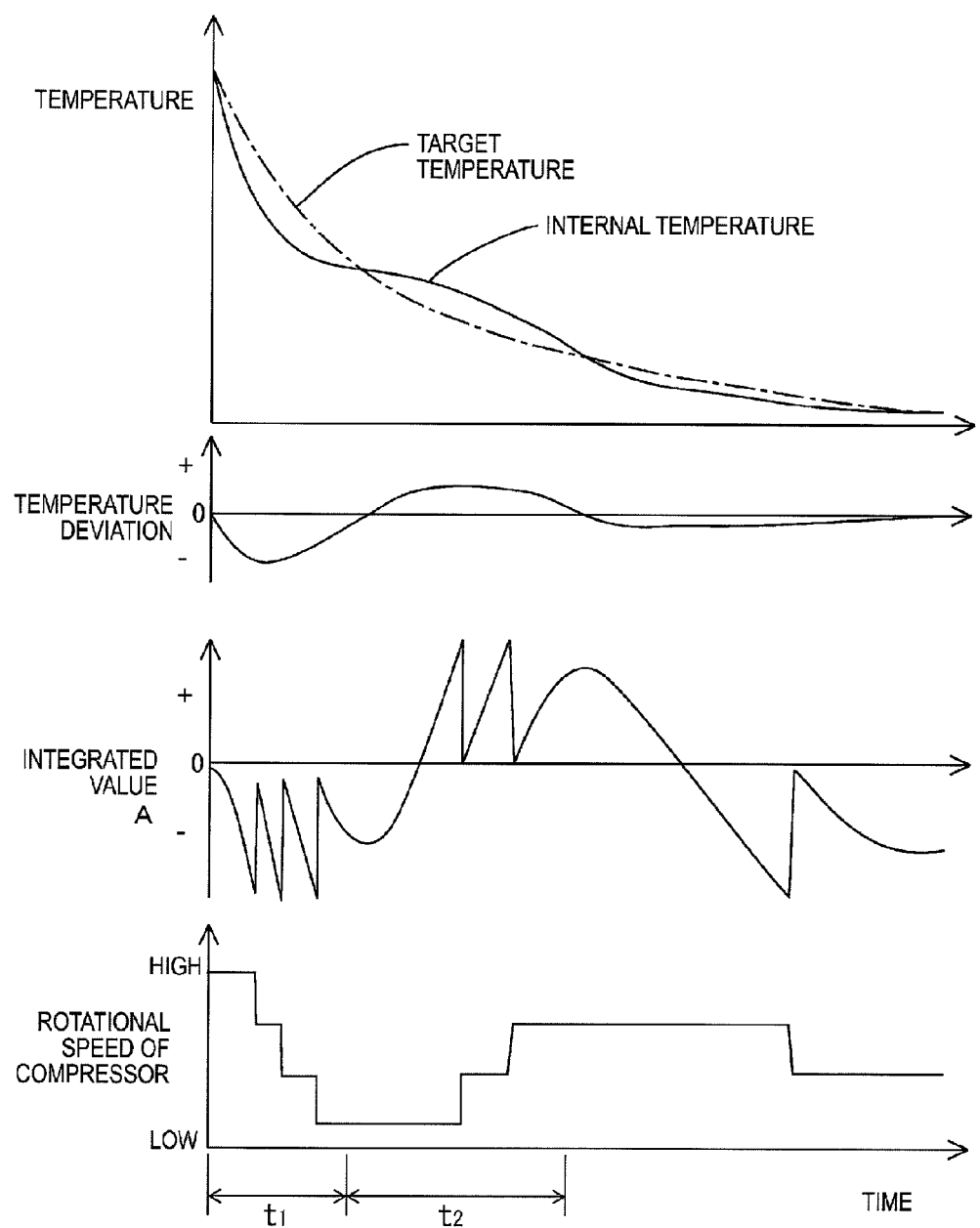
FIG. 8 is a graph showing the relation between a varying mode of an internal temperature and a rotational speed of a compressor at a time of a pull-down cooling operation according to embodiment 1.
Figure 9:
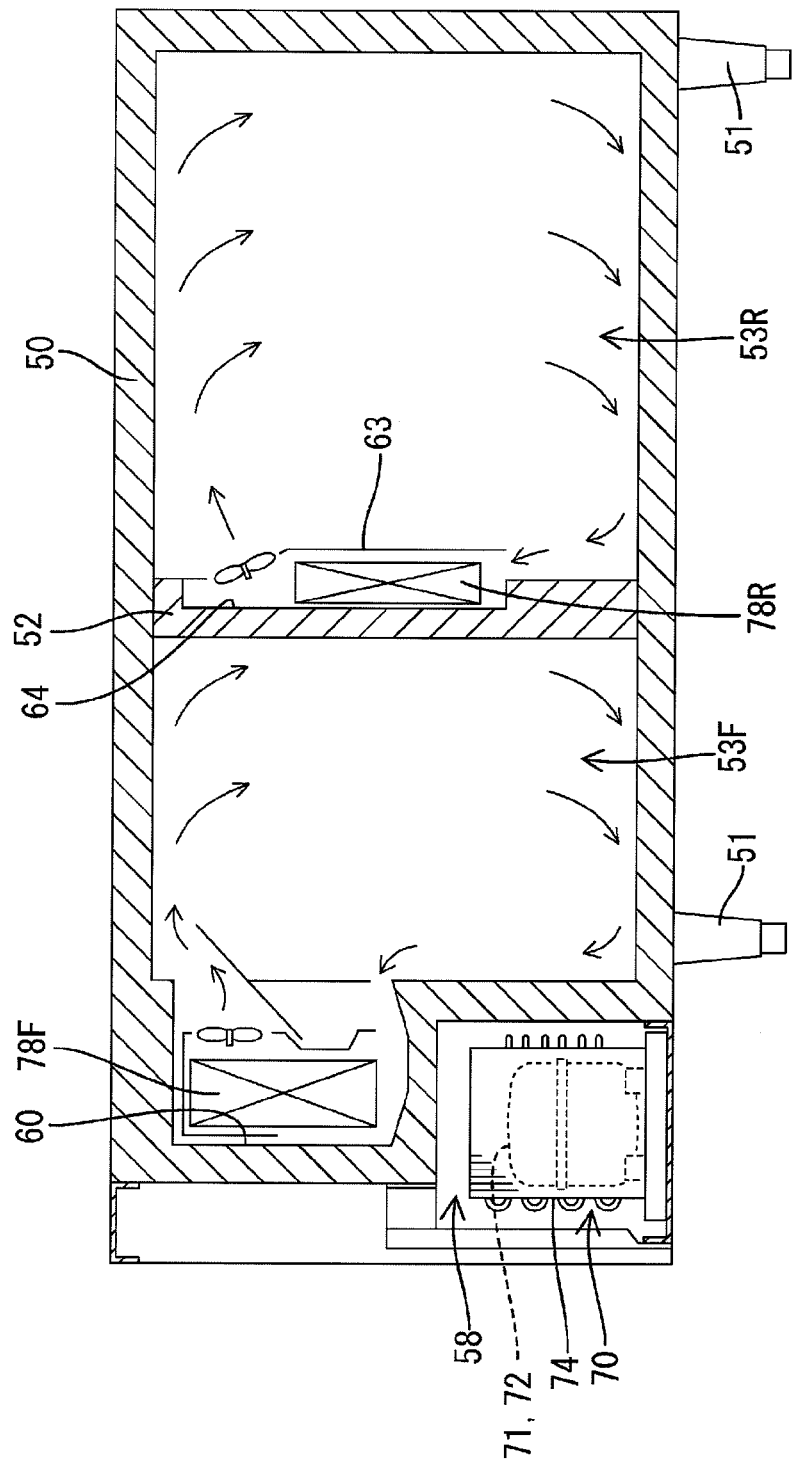
FIG. 9 is an overall sectional view showing embodiment 2 of the present invention.

According to the present embodiment, for example, if it is assumed that a mode of variation with time of a target temperature at the time of a pull-down cooling operation is set as shown in a graph illustrated by an alternate long and short dash line in FIG. 8, and the actual internal temperature changes as shown by the solid line, because the internal temperature is initially cooled to a lower temperature than the target temperature just after a cooling operation commences, the temperature deviation is a minus value and the integrated value A also becomes a minus value. In this case, the graph of the integrated value A is a sawtooth wave shape because the integrated value A is initialized each time the rotational speed of the inverter motor 31 is changed (step 58 in FIG. 7). Thus, since the integrated value A is a minus value and is lower than the lower limit value L_DOWN, the inverter frequency gradually decreases (see time span t1). As a result, the rotational speed of the compressor is decreased in phases and the cooling capacity is suppressed. Hence, the internal temperature approaches the decreasing level of the target temperature.

When the internal temperature becomes higher than the target temperature as the result of the cooling capacity decreasing (time span t2), the temperature deviation and the integrated value A shift to plus values. When the integrated value A becomes greater than the upper limit value L_UP, the rotational speed of the compressor is increased. As a result, the cooling capacity increases and the internal temperature again approaches the decreasing level of the target temperature. Thereafter, by repeating such the control, the internal temperature decreases in accordance with the mode of variation with time of the target temperature that is set.

Thus, during a pull-down cooling operation as described above, for example, even if the heat insulating door 15 of the heat insulating storage cabinet 10 is temporarily opened and outside air flows in and causes the internal temperature to temporarily rise, the temperature that has increased temporary is rapidly restored to its original level when the heat insulating door 15 is closed. Therefore, as long as the temporary temperature rise is observed as the integrated value of the temperature deviations, there is no sudden change in the integrated value. Consequently, stable control is achieved in which the controller 40 does not react oversensitively and rapidly increase the rotational speed of the compressor 22, thus contributing to power saving.

In this connection, similarly to the foregoing description regarding a pull-down cooling operation, at a time of a control operation that cools stock such as foodstuffs at a set temperature that is set by the user, an upper limit value and a lower limit value that sandwich the set temperature from above and below are decided, a target temperature varying mode that shows the manner in which the internal temperature should be changed in a time wise manner from the upper limit value towards the lower limit is converted into function and stored in the storing means 43, and the rotational speed of the compressor is controlled in the same manner as for the pull-down cooling operation. Accordingly, at the time of a control operation also, there is no oversensitive reaction to a temporary sudden change in the internal temperature caused by opening and closing of the heat insulating door 15 or the like, and power saving can be achieved. Further, since the compressor 22 is controlled so as to follow a target temperature varying mode that is stored, the compressor 22 can be shut down at an appropriate time with certainty, and a kind of defrosting function can be performed at the cooler 27 so that formation of a large amount of frost can be prevented.

Further, in regard to refrigerators for commercial use, a situation in which the above described pull-down cooling operation is required is not limited to when a refrigerator is initially installed. Examples of other cases in which a pull-down cooling operation is required include a case in which operation of a refrigerator is restarted after several hours have elapsed after disconnecting the power, a case in which the door is left open for a long time when carrying in a large amount of foodstuffs, and a case in which a large quantity of foodstuffs that have a high temperature immediately after cooking are stored in the refrigerator. Therefore, the aforementioned cooling characteristics are extremely important. In consideration of this point, according to the present embodiment, the cooling characteristic at the time of a pull-down cooling operation is provided not just simply as a final target value of the temperature, but is provided as a mode of variation with time of the target temperature. Consequently, the common freezing unit 20 can be used for heat insulating storage cabinets of different specifications.

It should be noted that, particularly according to the present embodiment, the target temperature setting means includes storing means that stores a function that represents a mode of variation with time of a target temperature, and target temperature calculating means that reads out a function stored in the storing means and calculates a target temperature in accordance with the passage of time. More specifically, since the target temperature varying mode is converted into a function and stored in the storing means 43, there is the advantage that the amount of storage capacity required is small compared with a case in which a target temperature varying mode is tabularized and stored.

Embodiment 2

Next, embodiment 2 of the present invention is described referring to FIG. 9 to FIG. 13.

In this embodiment, an example is described in which the present invention is applied to a horizontal (table-type) freezer-refrigerator for commercial use. First, the overall structure is described using FIG. 9. Reference numeral 50 denotes a heat insulating storage cabinet that is composed by a horizontally longer thermally insulated box. The thermally insulated box has an opening in the front thereof. The storage cabinet 50 is supported by legs 51 that are provided at four corners on the bottom of the storage cabinet 50. The inside of the heat insulating storage cabinet 50 is partitioned into right and left sides by an additional heat insulating partition wall 52. The left and relatively narrower side is defined as a freezing compartment 53F. The freezing compartment 53F corresponds to a first storage compartment. The right and wider side is defined as a refrigerating compartment 53R. The refrigerating compartment 53R corresponds to a second storage compartment. In this connection, although not shown in the drawings, each of the freezing compartment 53F and the refrigerating compartment 53R has an opening in the front face thereof. Pivotable heat insulating doors are mounted in the openings so as to be capable of opening and closing.

The left portion of the heat insulating storage cabinet 50 viewed from the front thereof is provided with an equipment compartment 58. A heat insulating cooler compartment 60 is convexly formed at the inner side in the upper part inside the equipment compartment 58. The cooler compartment 60 is in communication with the freezing compartment 53F. A freezing unit 70, described later, is accommodated below the cooler compartment 60 in a condition in which the freezing unit 70 can be taken into and out from that installation location. A duct 63 is spread across a face of the partition wall 52 on the refrigerating compartment 53R side, whereby another cooler compartment 64 is formed.

Figure 10:
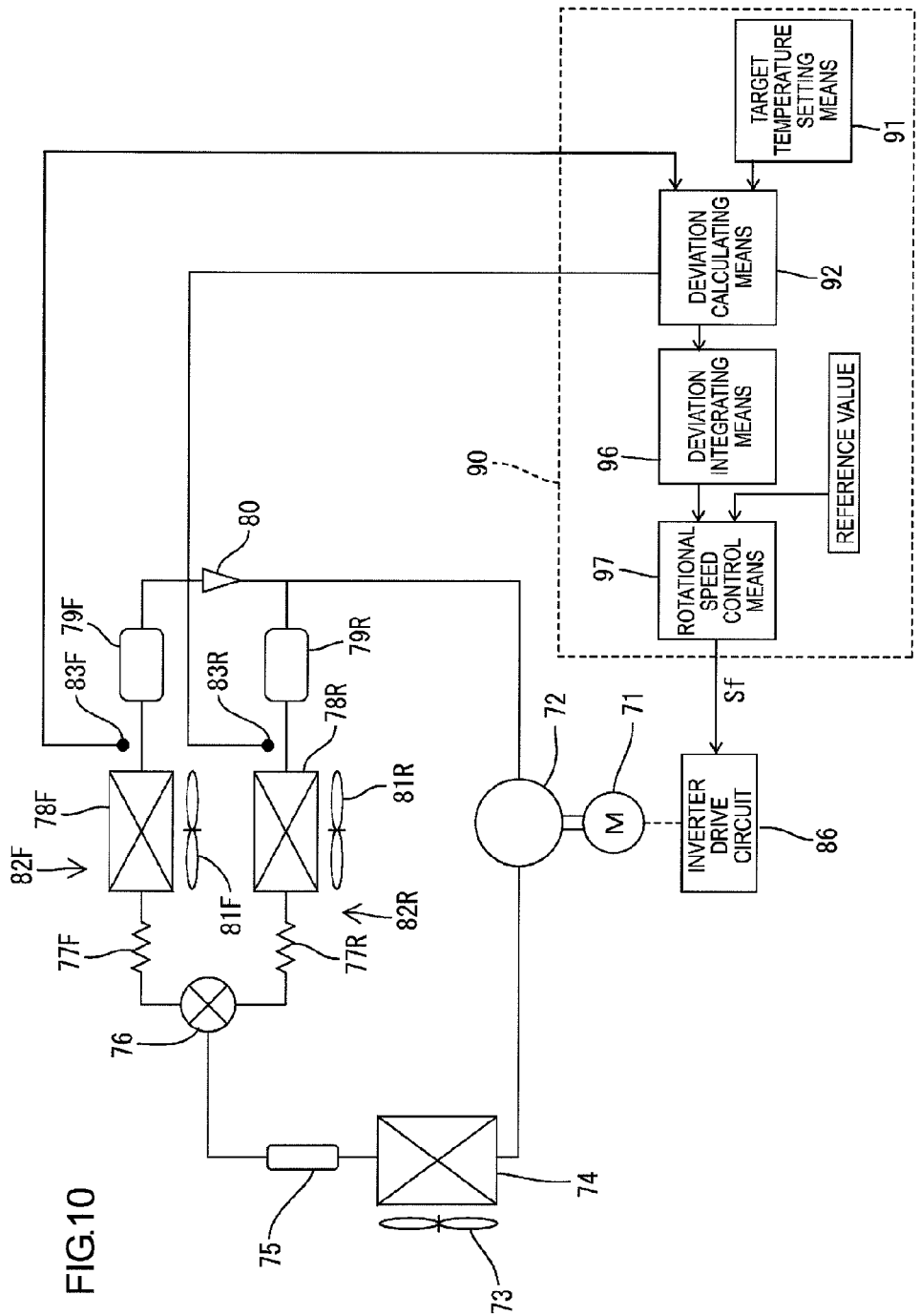
FIG. 10 is a configuration diagram of a freezing cycle according to embodiment 2.
Figure 11:
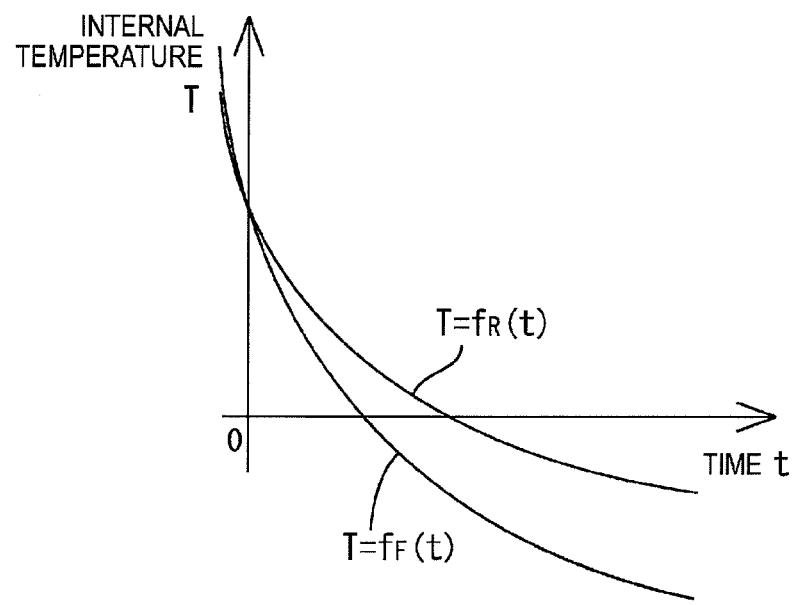
FIG. 11 is a graph showing a mode of variation with time of a target temperature of a freezing compartment and a refrigerating compartment according to embodiment 2.

As shown in FIG. 10, the above described freezing unit 70 includes a compressor 72 that is driven by an inverter motor 71 and compresses a refrigerant. A refrigerant discharging side of the compressor 72 is connected to an inlet side of a three-way valve 76 that is a valve mechanism through a condenser 74 that is cooled by a condenser fan 73, and a dryer 75. One outlet of the three-way valve 76 connects to a first cooler 78F that is housed inside the cooler compartment 60 on the freezing compartment 53F side through a capillary tube 77F that corresponds to a throttling device. The other outlet of the three-way valve 76 connects to a second cooler 78R that is housed inside the cooler compartment 64 on the refrigerating compartment 53R side through a capillary tube 77R as a throttling device. After the refrigerant outlet of the first cooler 78F is connected in turn to an accumulator 79F and a check valve 80, and the refrigerant outlet of the second cooler 78R is connected to an accumulator 79R, these two channels merge and eventually connect to a suction side of the compressor 72. As a result, by switching the three-way valve 76, the refrigerant from the condenser 74 can be selectively switched between a first flow channel 82F that returns to the compressor 72 through the capillary tube 77F, the first cooler 78F, the accumulator 79F, and the check valve 80 in that sequence, and a second flow channel 82R that returns to the compressor 72 through the capillary tube 77R, the second cooler 78R, and the accumulator 79R in that sequence. Thus, the refrigerant can be selectively supplied to the first and the second coolers 78F and 78R.

Note that, in a period in which the compressor 72 is being driven, the three-way valve 76 is configured to be capable of switching alternately to the first and the second flow channels 82F and 82R, respectively, for each predetermined time period. Further, temperature sensors 83F and 83R for detecting the internal temperature of the freezing compartment 53F and the refrigerating compartment 53R are respectively provided at positions in the respective cooler compartments 60 and 64 that come in contact with air inside the cabinet.

Similarly to the above described embodiment 1, the inverter motor 71 is driven by an inverter drive circuit 86 that outputs an alternating current of a variable frequency. The output frequency is decided by a controller 90. The controller 40 will now be described in detail referring to FIG. 10. The controller 90 comprises target temperature setting means 91 for setting target temperatures for inside the freezing compartment 53F and the refrigerating compartment 53R, and deviation calculating means 92 that calculates deviations between the target temperatures that are set by the target temperature setting means 91 and actual internal temperatures detected by the aforementioned two temperature sensors 83F and 83R. In this case, when the target temperature of the freezing compartment 53F is denoted by TFa, the actual internal temperature of the freezing compartment 53F is denoted by TF, the target temperature of the refrigerating compartment 53R is denoted by TRa, and the actual internal temperature of the refrigerating compartment 53R is denoted by TR, the aforementioned deviations are defined as (TF−TFa) and (TR−TRa).

The target temperature setting means 91 of the present embodiment 2 is similar to the target temperature setting means of embodiment 1 shown in FIG. 3, except that the target temperature setting means 91 outputs two target temperatures TFa and TRa for the freezing compartment 53F and the refrigerating compartment 53R, respectively. More specifically, the respective target temperatures of the freezing compartment 53F and the refrigerating compartment 53R are provided as modes of variation with time (that is, a manner in which a target temperature is changed along with a time t). The target temperature varying modes include two varying modes. One of the varying modes is a target temperature varying mode at the time of a control operation that cools stored items such as food at a set temperature that is set by the user. The other mode is a target temperature varying mode at a time of a so-called pull-down cooling operation that, for example, as in a case in which a freezer-refrigerator is installed and the power is turned on for the first time, performs cooling from a temperature that is substantially higher than a set temperature in the control operation to a lower temperature that is in a temperature range for the control operation. Each of the varying modes is represented by a function having time t as a variable. The functions are stored, for example, in storing means that comprises an EEPROM or the like. For example, functions TFa=fF(t) and TRa=fR(t) can be illustrated by a graph shown in FIG. 11. These functions represent varying modes of target temperatures TFa and TRa of the freezing compartment 53F and the freezing compartment 53R, respectively, at the time of a pull-down cooling operation.

Figure 12:
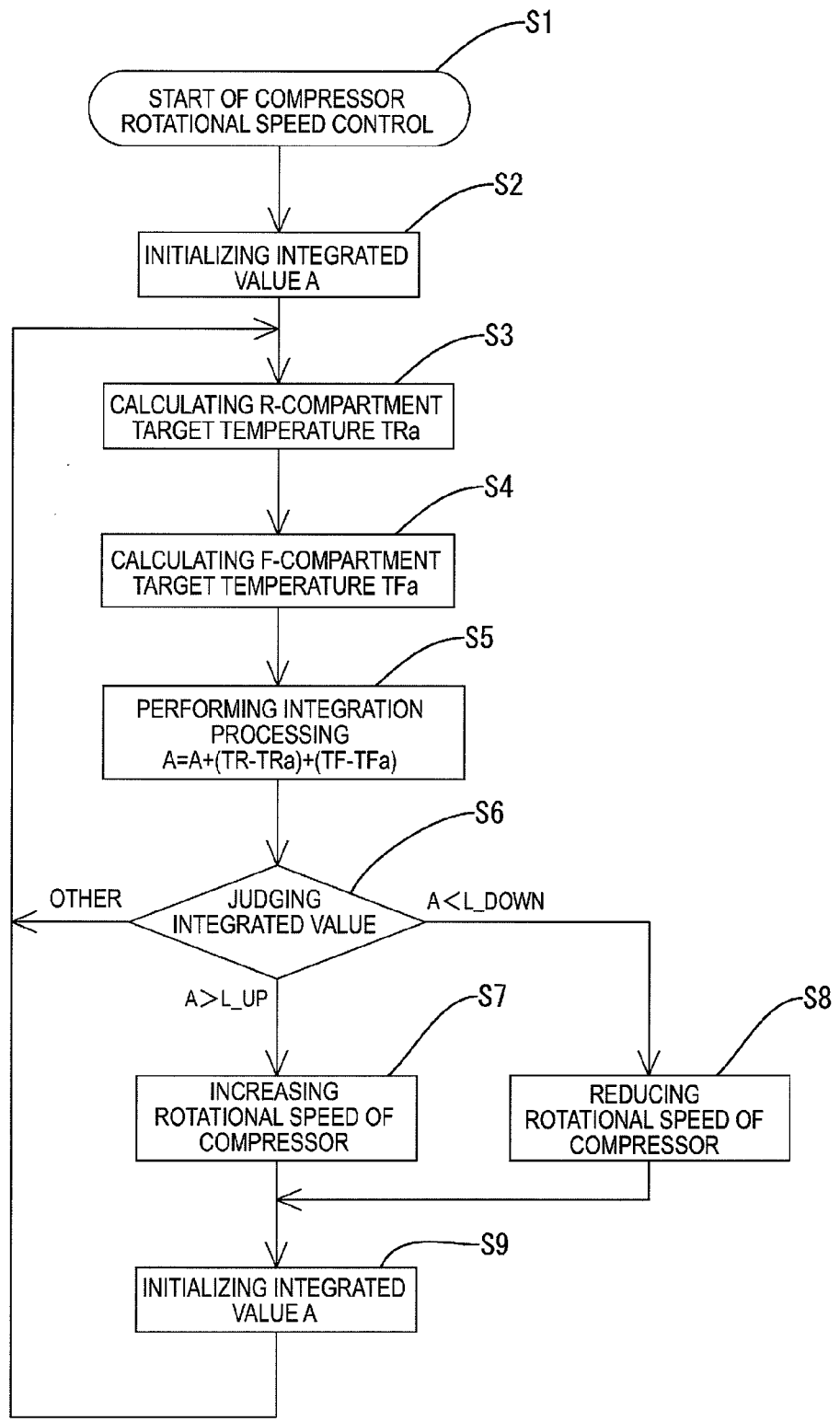
FIG. 12 is a flowchart that illustrates procedures that control a rotational speed of a compressor according to embodiment 2.

The two target temperatures TFa and TRa from the target temperature setting means 91 and the two internal temperatures TF and TR obtained from the respective temperature sensors 83F and 83R are provided to deviation calculating means 2. The deviation calculating means 2 calculates the respective deviations (TF−TFa) and (TR−TRa). Subsequently, the value of each deviation is provided to a deviation integrating means 96 at the next stage. In this case, for example, deviations during a period of between two minutes and ten minutes (according to this embodiment, five minutes) are added up and integrated on both the refrigerating compartment 53R side and the freezing compartment 53F side, and those values are supplied to rotational speed control means 97. At the rotational speed control means 97, the integrated values of the deviations are compared with predetermined reference values (lower limit value and upper limit value). When either of the integrated values is greater than an upper limit value L_UP, a frequency command signal Sf to the inverter drive circuit 86 is changed so as to increase the rotational speed of the inverter motor 71. When either of the integrated values is less than a lower limit value L_DOWN, the frequency command signal Sf to the inverter drive circuit 86 is changed so as to reduce the rotational speed of the inverter motor 71. Note that the functions of the rotational speed control means 47 are realized by software that is executed by a CPU. A processing procedure of the software is as shown in FIG. 12.

The software configuration will now be explained with reference to FIG. 12. When a compressor rotation control commencement routine is started by the CPU (step S1), first, an integrated value A is initialized to, for example, 0 (step S2). Next, as described above, the target temperature setting means 91 calculates the target temperatures TRa and TFa of the refrigerating compartment 53R and the freezing compartment 53F, respectively (steps S3 and S4). Thereafter, the target temperature setting means 91 calculates the deviations A between these target temperatures TRa and TFa and the actual internal temperatures TR and TF, and integrates these values (functions of deviation calculating means 92 and deviation integrating means 96: step S5). Subsequently, in step S6, the CPU compares the integrated value with the upper limit value L_UP and the lower limit value L_DOWN, and increases or reduces the rotational speed of the inverter motor 71 (function of rotational speed control means 97: steps S6 to S8).

Figure 13:
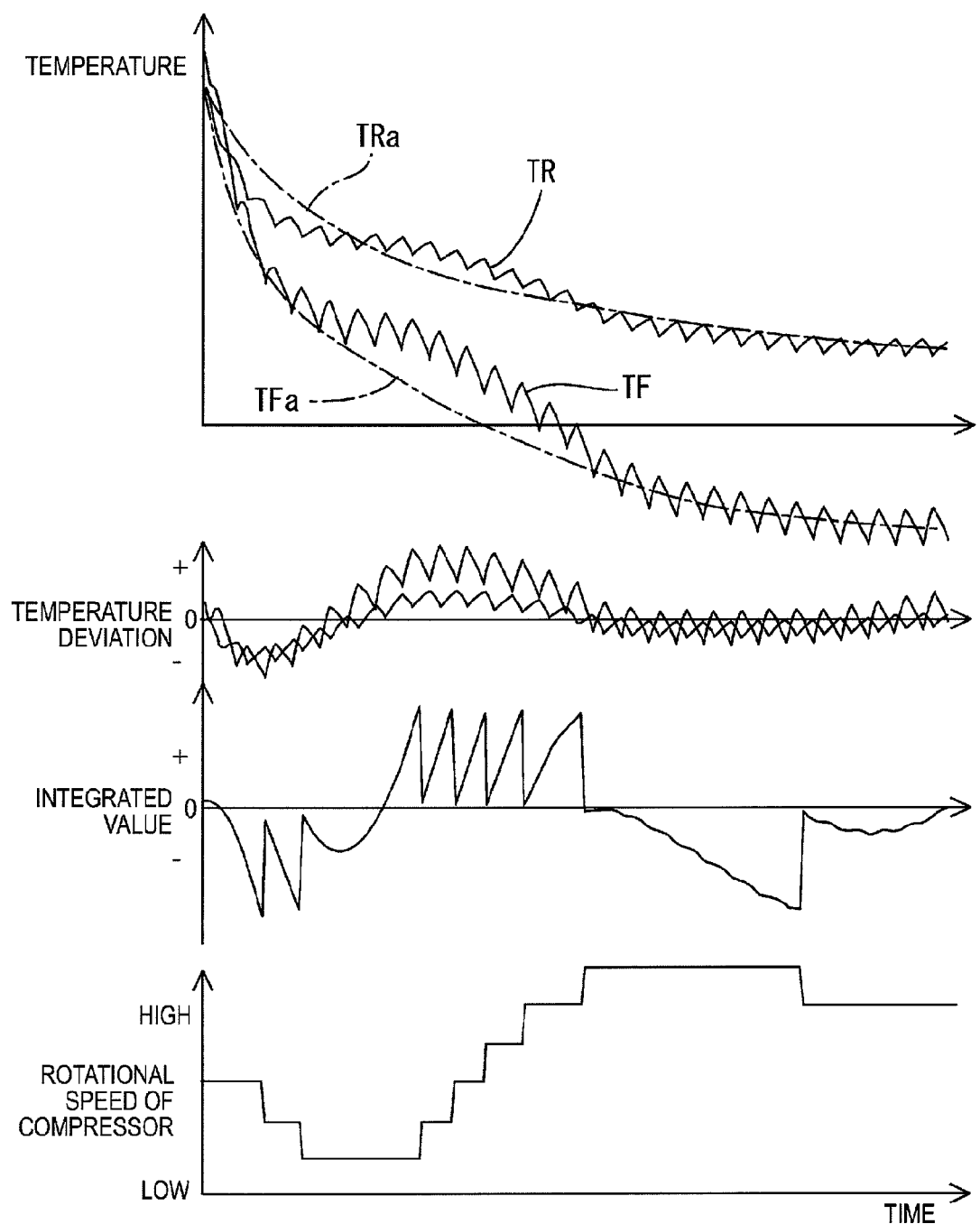
FIG. 13 is a graph showing the relation between a varying mode of an internal temperature and a rotational speed of a compressor at a time of a pull-down cooling operation according to embodiment 2.

According to the present embodiment 2, it is assumed that, for example, the modes of variation with time of the respective target temperatures TFa and TRa of the freezing compartment 53F and the refrigerating compartment 53R at the time of a pull-down cooling operation are set as shown by alternate long and short dash lines in a graph shown in FIG. 13, and that the actual internal temperatures Tf and TR of the freezing compartment 53F and the refrigerating compartment 53R change as shown by the solid lines. Thus, for example, during an initial phase after a cooling operation commences, the refrigerating compartment 53R side is cooled so that the internal temperature TR becomes lower than the target temperature TRa, while the freezing compartment 53F side is cooled so that the internal temperature TF is substantially equal to the target temperature TFa. Therefore, the total temperature deviation becomes a minus value, and the integrated value A also becomes a minus value. In this case, a graph of the integrated value A is a sawtooth wave shape because the integrated value A is initialized for each predetermined time period (step S9 in FIG. 12). Thus, since the integrated value A is a minus value and is lower than the lower limit value L_DOWN, the inverter frequency gradually decreases in the initial stage. As a result, the rotational speed of the compressor decreases in phases, and the cooling capacity is suppressed. Accordingly, the internal temperatures approach the decreasing levels of the target temperatures.

When the internal temperatures become higher than the target temperatures as the result of the cooling capacity decreasing, the respective temperature deviations of the freezing compartment 53F and the refrigerating compartment 53R as well as the integrated value A thereof shift to a plus value. When the total integrated value A becomes greater than the upper limit value L_UP, the rotational speed of the compressor is increased, which causes an increase in the cooling capacity. Accordingly, the internal temperatures again approach the decreasing levels of the target temperatures. Such control is repeated thereafter, and the internal temperatures are thereby decreased in accordance with the modes of variation with time of the set target temperatures.

Thus, during a pull-down cooling operation as described above, for example, even if the heat insulating door 15 of the heat insulating storage cabinet 10 of the refrigerator is temporarily opened and outside air flows in and causes the internal temperature to temporarily rise, the temperature that temporarily rises is rapidly restored to its original level when the heat insulating door is closed. Therefore, as long as the temporary temperature rise is observed as the integrated value of the temperature deviations, there is no sudden change in the integrated value. Consequently, stable control is achieved in which the controller 90 does not react oversensitively and rapidly increase the rotational speed of the compressor 72, and thus contributes to power saving.

In this connection, similarly to the foregoing description regarding a pull-down cooling operation, at a time of a control operation that cools stock such as foodstuffs at a set temperature that is set by the user, an upper limit value and a lower limit value that sandwich the set temperature from above and below are decided, a target temperature varying mode that shows the manner in which the internal temperature should be changed in a time wise manner from the upper limit value towards the lower limit is converted into a function and stored in storing means, and the rotational speed of the compressor is controlled in the same manner as for the pull-down cooling operation. Accordingly, at the time of a control operation also, there is no oversensitive reaction to a temporary sudden change in the internal temperature caused by opening and closing of a heat insulating door or the like, and power saving can be achieved. Further, since the compressor 72 is controlled so as to follow a target temperature varying mode that is stored, the compressor 72 can be shut down at an appropriate time with certainty, and a kind of defrosting function can be performed at the respective coolers 78F and 78R so that formation of a large amount of frost can be prevented.

Further, in regard to refrigerators for commercial use, a situation in which the above described pull-down cooling operation is required is not limited to when a refrigerator is initially installed. Examples of other cases in which a pull-down cooling operation is required include a case in which operation of a refrigerator is restarted after several hours have elapsed after disconnecting the power, a case in which the door is left open for a long time when carrying in a large amount of foodstuffs, and a case in which a large quantity of foodstuffs that have a high temperature immediately after cooking are stored in the refrigerator. Therefore, the aforementioned cooling characteristics are extremely important. In consideration of this point, according to the present embodiment the cooling characteristic at the time of a pulldown cooling operation is provided not just simply as a final target value of the temperature, but is provided as a mode of variation with time of the target temperature. Consequently, the common freezing unit 70 can be used for heat insulating storage cabinets of different specifications.

Moreover, according to the present embodiment, when providing a target temperature as a mode of variation with time, the target temperature is provided as a target temperature for each predetermined time period. Therefore, for example, in comparison to a case of providing a target temperature as a rate of change in temperature for each predetermined time period, there is the advantage that the present invention is suitable for a refrigerating storage cabinet of a type that cools two compartments by alternately supplying refrigerant from a single compressor 72 to two coolers 78F and 78R. More specifically, a case may be assumed of a configuration that provides a cooling target as a rate of change in temperature for each predetermined time period and that controls a rotational speed of the compressor 72 so as to approach that rate of change. In this case, when using a refrigerating storage cabinet of a type that cools two storage compartments alternately, while one storage compartment is being cooled, for example, the internal temperature rises when the door of the other storage compartment is temporarily opened, and it becomes the turn of that storage compartment to be cooled when the door is closed. As a result, the internal temperature decreases immediately and hence the refrigerating operation achieves the target rate of change. Therefore, a situation arises in which the rotational speed of the compressor 72 is reduced irrespective of the fact that the internal temperature has actually increased a little. When this kind of situation is repeated, it is no longer possible to lower the internal temperature in the anticipated manner.

In contrast, according to the present embodiment a configuration is adopted in which a mode of variation with time of a target temperature is provided as a target temperature that differs (becomes gradually lower) for each predetermined time period. Therefore, in a case in which there is a temporary increase in an internal temperature, unless the target temperature can be reached at that time, the rotational speed of the compressor 72 is increased to raise the cooling capacity. Hence, the internal temperature can be reliably lowered in accordance with the setting.

Other Embodiments

The present invention is not limited to the embodiments described above with reference to the drawings. For example, the following embodiments are also included in the technical scope of the present invention.

(1) In the foregoing embodiments, a deviation between a target temperature and an internal temperature is calculated and integrated for each predetermined time period, and when the integrated value exceeds a predetermined reference value, and the rotational speed of the compressor is immediately increased. However, other conditions may also be taken into consideration when deciding the rotational speed of the compressor.

Figure 14:
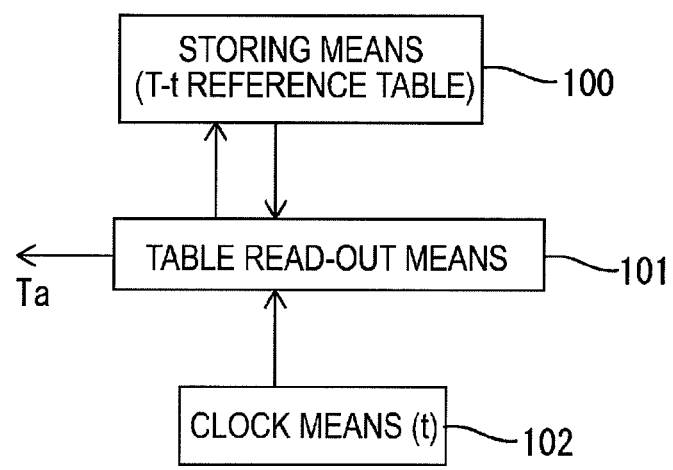
FIG. 14 is a block diagram showing another embodiment that is provided with a different target temperature setting means.

(2) In the foregoing embodiments, as shown in FIG. 3, a configuration is adopted in which the target temperature setting means stores a function that represents a mode of variation with time of a target temperature in the storing means 43, and then reads out the function stored in the storing means 43 to calculate a target temperature in accordance with the passage of time. However, the present invention is not limited to this configuration. For example, as shown in FIG. 14, a configuration may be adopted in which a reference table relating a mode of variation with time of a target temperature with a temperature and an elapsed time is generated beforehand, the reference table is stored in storing means 100, and in response to a signal from clock means 102, a target temperature in the storing means 100 is read out in accordance with the passage of time by table read-out means 101.

The invention claimed is:

1. A control method of a compressor in a refrigerating storage cabinet that compresses a refrigerant using the compressor that is driven by an inverter motor, supplies the refrigerant to a cooler through a condenser and a throttling device, and cools an inside of a storage compartment by means of cold air that is generated by the cooler, the refrigerating storage cabinet comprising:
   target temperature setting means for setting a target temperature for inside the storage compartment; and
   a temperature sensor that detects an internal temperature inside the storage compartment,
   said control method comprising:
   calculating and integrating a deviation between the target temperature that is set by the target temperature setting means and an internal temperature that is detected by the temperature sensor for each predetermined time period; and
   increasing a rotational speed of the inverter motor when the integrated value is greater than an upper limit value, or reducing the rotational speed of the inverter motor when the integrated value is less than a lower limit value.

2. A refrigerating storage cabinet, comprising:
   a compressor that is driven by an inverter motor;
   a condenser that causes heat to be released from a refrigerant that is compressed by the compressor;
   a cooler to which a refrigerant from the condenser is supplied through a throttling device;
   a heat insulating storage cabinet in which a storage compartment interior is cooled by cold air that is generated by the cooler;
   target temperature setting means for setting a target temperature for inside the storage compartment of the heat insulating storage cabinet;
   a temperature sensor that detects an internal temperature within the storage compartment;
   deviation calculating means that calculates a deviation between the target temperature that is set by the target temperature setting means and an internal temperature that is detected by the temperature sensor for each predetermined time period;
   deviation integrating means that integrates a sum of deviations for a predetermined number of times that are calculated by the deviation calculating means; and
   rotational speed control means that compares an integrated value that has been integrated by the deviation integrating means with a reference value, and increases a rotational speed of the inverter motor when the integrated value is greater than an upper limit of the reference value, or reduces the rotational speed of the inverter motor when the integrated value is less than a lower limit of the reference value.

3. The refrigerating storage cabinet according to claim 2, wherein the target temperature setting means is configured to sequentially output target temperatures that differ with a passage of time.

4. The refrigerating storage cabinet according to claim 2, wherein the target temperature setting means comprises storing means that stores a function that represents a mode of variation with time of a target temperature, and target temperature calculating means that reads out a function that is stored in the storing means to calculate a target temperature in accordance with a passage of time.

5. The refrigerating storage cabinet according to claim 2, wherein the target temperature setting means comprises storing means that stores a mode of variation with time of a target temperature as a reference table that relates a temperature with an elapsed time, and table read-out means that reads out a target temperature in the storing means in accordance with a passage of time.

6. The refrigerating storage cabinet according to claim 3, wherein the target temperature setting means comprises storing means that stores a function that represents a mode of variation with time of a target temperature, and target temperature calculating means that reads out a function that is stored in the storing means to calculate a target temperature in accordance with a passage of time.

7. A refrigerating storage cabinet, comprising:
a compressor that is driven by an inverter motor;
a condenser that causes heat to be released from a refrigerant that is compressed by the compressor;
a valve mechanism that selectively switches a refrigerant from the condenser to a first and a second flow channel;
a first and a second cooler that are individually provided in the first and the second flow channels, respectively, and to which the refrigerant is selectively supplied;
a throttling device provided between a side of a refrigerant inlet to the first and the second coolers and the condenser;
a heat insulating storage cabinet that has a first and a second storage compartment, in which the storage compartments are cooled by cold air that is generated by the respective coolers;
target temperature setting means for setting a target temperature for inside the first and the second storage compartments;
a temperature sensor that detects an internal temperature inside the first and the second storage compartment, respectively;
deviation calculating means that calculates a deviation between the target temperature that is set by the target temperature setting means and an internal temperature that is detected by the temperature sensor for each predetermined time period;
deviation integrating means that integrates a sum of deviations for a predetermined number of times that are calculated by the deviation calculating means; and
rotational speed control means that compares an integrated value that has been integrated by the deviation integrating means with a reference value, and increases a rotational speed of the inverter motor when the integrated value is greater than an upper limit of the reference value, or reduces the rotational speed of the inverter motor when the integrated value is less than a lower limit of the reference value.

8. The refrigerating storage cabinet according to claim 7, wherein the target temperature setting means is configured to sequentially output target temperatures that differ with a passage of time.

9. The refrigerating storage cabinet according to claim 7, wherein the target temperature setting means comprises storing means that stores a function that represents a mode of variation with time of a target temperature, and target temperature calculating means that reads out a function that is stored in the storing means to calculate a target temperature in accordance with a passage of time.

10. The refrigerating storage cabinet according to claim 8, wherein the target temperature setting means comprises storing means that stores a function that represents a mode of variation with time of a target temperature, and target temperature calculating means that reads out a function that is stored in the storing means to calculate a target temperature in accordance with a passage of time.

11. The refrigerating storage cabinet according to claim 7, wherein the target temperature setting means comprises storing means that stores a mode of variation with time of a target temperature as a reference table that relates a temperature with an elapsed time, and table read-out means that reads out a target temperature in the storing means in accordance with a passage of time.

12. The refrigerating storage cabinet according to claim 3, wherein the target temperature setting means comprises storing means that stores a mode of variation with time of a target temperature as a reference table that relates a temperature with an elapsed time, and table read-out means that reads out a target temperature in the storing means in accordance with a passage of time.

13. The refrigerating storage cabinet according to claim 8, wherein the target temperature setting means comprises storing means that stores a mode of variation with time of a target temperature as a reference table that relates a temperature with an elapsed time, and table read-out means that reads out a target temperature in the storing means in accordance with a passage of time.

* * * * *

UNITED STATES PATENT AND TRADEMARK OFFICE
CERTIFICATE OF CORRECTION

PATENT NO.        : 8,474,280 B2
APPLICATION NO.   : 12/527581
DATED             : July 2, 2013
INVENTOR(S)       : Naoshi Kondou It is certified that error appears in the above-identified patent and that said Letters Patent is hereby corrected as shown below:

Title Page:

(73) Assignee: change Hoshizaki Denki Kabushiki Kaishi to -- Hoshizaki Denki Kabushiki Kaisha --.

Signed and Sealed this
Twenty-fourth Day of September, 2013

Teresa Stanek Rea
*Deputy Director of the United States Patent and Trademark Office*